Patented Sept. 17, 1940

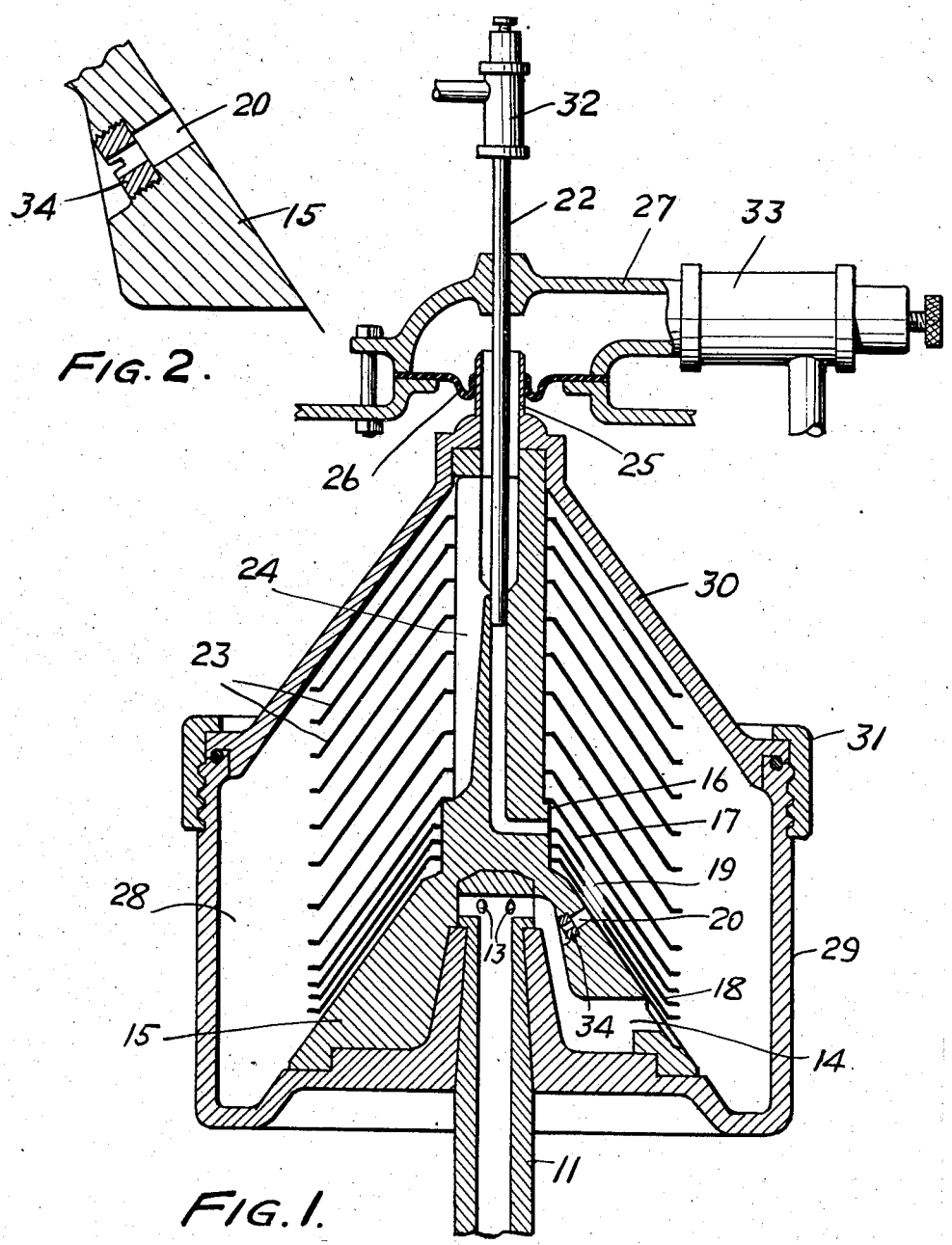

2,214,831

UNITED STATES PATENT OFFICE 2,214,831

CENTRIFUGE FOR CLARIFYING AND STANDARDIZING MILK

Selden H. Hall, Poughkeepsie, N. Y., assignor to The De Laval Separator Company, New York, N. Y., a corporation of New Jersey Original application July 7, 1938, Serial No. 217,891. Divided and this application May 17, 1939, Serial No. 274,205

9 Claims. (Cl. 233—27)

The object of my invention is to provide a centrifuge which will efficiently and reliably both standardize and clarify milk.

Many of the larger milk companies have for some time been paying to milk producers a premium for all fat content above 3½% until the average of the milk they receive is often well above 4%. At the same time their competitors are putting them at a disadvantage by buying and paying for only milk that averages but a little above the legal 3½% fat requirement.

A very large portion of the market milk is now centrifugally clarified to remove sediment and the object of my invention is to, while clarifying the milk, remove therefrom a large proportion of the fat in excess of the 3½% legal standard.

In an application filed by me July 7, 1938, Serial No. 217,891, of which this application is a division, I disclose a process of treating whole milk to reduce its butter fat content to a predetermined percentage. In this process a minor part of the whole milk is centrifuged to separate milk relatively rich in butter fat from milk relatively poor in butter fat, which may be designated respectively as cream and skim milk. The skim milk is then added to the major (unskimmed) part of the whole milk and the mixture subjected to centrifugal clarification, thereby producing a whole milk having precisely the characteristics of the original whole milk and differing therefrom only in that it has a predetermined reduced percentage of butter fat.

This process requires no novel operating devices for its execution, but merely a new arrangement of old operating devices. For example, the whole milk may be divided into a major stream and a minor stream, the former going direct to a clarifier of conventional type and the latter going to a separator of conventional type. From the separator the skim milk from which the cream has been separated may be conveyed to the major stream and the mixture of unskimmed and skimmed milk conveyed to a clarifier of conventional type having a single outlet, wherein the whole milk is clarified and from which it is delivered.

While the process can thus be practiced by the described new arrangement of old elements, I have designed a single centrifuge in which the whole process may be practiced in a manner more simple, rapid and economical than by a new set-up of old elements. Such novel centrifuge comprises a bowl having a comparatively large clarifying compartment provided with a single outlet and a comparatively small separating compartment provided with separate outlets for the cream and skim milk, the skim milk outlet opening into the clarifying compartment, and a feed element for whole milk whose fat content it is desired to reduce which delivers a minor proportion of the whole milk directly into the separating compartment and a major portion of the whole milk directly into the clarifying compartment. The latter thus receives for clarification both a relatively large volume of unskimmed whole milk and a relatively small volume of skimmed whole milk. In the clarifying compartment the skim milk is thoroughly mixed with the whole milk and the mixture is delivered from the clarifying compartment as a homogeneous whole milk having all the characteristics of the original whole milk except that its butter fat content has been reduced. The separating compartment, although of small dimensions compared with the clarifying compartment, should be of a size adequate to remove enough butter fat from the richest whole milk that it may be necessary to treat in order to reduce the fat content of the clarified whole milk to the standard percentage.

Since the percentage of butter fat in excess of the standard percentage in different batches of whole milk is subject to considerable variation, means are provided to control the proportion of fat removed from the milk being clarified so that the fat content of the skim milk delivered from the clarifying compartment will have the predetermined desired fat content.

A preferred embodiment of the invention is shown in the drawing. Fig. 1 is a vertical sectional view of a centrifuge embodying my invention. Fig. 2 is an enlarged sectional view of a detail of Fig. 1.

11 is a hollow spindle which supports and drives the bowl and through which and holes 13 whole milk enters passages 14 in the under side of the disc carrier 15. The disc carrier is provided with a shoulder 16 against which a disc 17, imperforate except for the center hole that fits around the stem of the disc carrier, fits tightly. Below the disc 17 there are a number of skimming discs 18 having distributing holes 19 with which passages 20, branching off from the passage 14, communicate.

From the inner edges of these discs a channel 21 leads into, and upward through, the stem of the disc carrier 15 to a stationary tube 22 that continues to the outside of the machine.

Above the disc 17 there is a plurality of clarifying discs 23, only a few of which are shown, the inner edges of which communicate with grooves 24 leading to the bowl outlet tube 25, revolving inside the seal 26, and the stationary discharge tube 27, while their outer edges open to the peripheral space 28 with which the passages 14 communicate.

The bowl has the usual shell 29 and top 30 held together by a coupling ring 31.

Whole milk whose fat content is to be reduced is fed through the spindle 11 and holes 13 to the passage 14 whence a minor part of it escapes through the passages 20 and the distributing holes 19 to the spaces between the discs 18 wherein the cream separates from the skim milk and escapes through the channel 21 and tube 22. The skim milk flows to the outer edges of the discs 18 and joins and mixes with the major portion of the whole milk as it flows out of the ends of the passages 14. The mixed milk then flows upward in the peripheral space and inward between the clarifying discs 23, where all dirt heavier than the milk is separated out, then upward through the grooves 24 and tube 25 to the discharge tube 27.

Different expedients may be adopted to control the rate of discharge of the butter fat; in other words, to control the proportion of butter fat removed from the milk being clarified. One expedient is to control the back pressure on the cream discharged from the separating compartment. This may be effected by a control valve 32, which may be of the type illustrated in the Hapgood Patent No. 2,145,544, issued January 31, 1939.

Alternately, the back pressure at the clarified milk outlet 27 may be varied by means of a throttle valve 33 on discharge tube 27. This valve may be essentially like valve 32, that is, a valve that will vary the resistance to flow of skim milk from the separating compartment to the clarifying compartment. Or the size of the whole milk passages 20, or of passage 14, may be varied by means of exchangeable bushings 34, shown in both Figs. 1 and 2 as applied to passages 20, or otherwise. These expedients, or either of them, may also be adopted in combination with variation in back pressure at the cream outlet 22, which latter expedient, however, will alone give the desired control.

It should be understood that the described combined centrifugal separator and clarifier does not contemplate subjecting the entire volume of the whole milk successively to separation and clarification, since this would require a centrifuge of impracticably large size. In a centrifuge involving my invention, since only a small percentage of the whole milk need be subjected to centrifugal separation, the separating compartment may be of such relatively very small size as to involve a bowl substantially no larger than the ordinary standard clarifying bowl.

What I claim and desire to protect by Letters Patent is:

1. The combination in a centrifugal machine for separating and clarifying milk, a bowl having a relatively large clarifying compartment and a relatively small separating compartment, the latter having a whole milk inlet, a skim milk outlet and an outlet adapted to deliver separated cream to an independent locus, the former having a whole milk inlet and a skim milk inlet communicating with the skim milk outlet of the separating compartment, and means to control the rate of discharge of the butter fat.

2. A centrifugal machine comprising a bowl having a relatively large clarifying compartment provided with an inlet to receive a major part of the feed liquid and a single outlet and thus adapted to have the liquid admitted thereto pass through it without separation of liquid components, and a relatively small separating compartment having an inlet to receive a minor portion of the feed liquid and two outlets one communicating with its peripheral zone and with the clarifying compartment and thus adapted to deliver its heavy separated constituent to the clarifying compartment and the other outlet communicating with its central zone and thus adapted to separately deliver a concentrated light component and means to control the rate of discharge of said concentrate.

3. A centrifugal machine comprising a bowl provided with two parallel centrifuging compartments, one being of relatively large dimensions having an inlet for a major portion of the liquid being treated and adapted to remove heavy solids therefrom and having a single outlet through which such liquid is discharged without separation, and the other of relatively small dimensions having an inlet for a minor portion of the liquid being treated and adapted to concentrate the lighter constituent and provided with two outlets through one of which the concentrate is separately discharged and through the other of which the heavier constituent is conveyed to the large compartment and therein clarified and discharged with the said major portion of the treated liquid.

4. A combined centrifugal separating and clarifying bowl having a relatively large clarifying compartment, a relatively small separating compartment, means to feed whole milk to the bowl and to deliver a larger part thereof to the clarifying compartment and a smaller part thereof to the separating compartment, and means to deliver separated skim milk from the separating compartment to the entrance to the clarifying compartment, the separating compartment having an independent discharge for separated cream.

5. A combined centrifugal separator and clarifier for clarifying the whole milk while removing therefrom a comparatively small proportion of cream to thereby produce whole milk of standardized cream content, which comprises a centrifugal bowl having a relatively large clarifying compartment and a relatively small separating compartment, a feed channel for whole milk communicating with both compartments, a cream outlet from the smaller compartment, a skim milk outlet from the smaller compartment communicating with the larger compartment and a clarified milk outlet from the larger compartment.

6. A combined centrifugal separator and clarifier for clarifying the whole milk while removing therefrom a comparatively small proportion of cream to thereby produce whole milk of standardized cream content, which comprises a centrifugal bowl having a relatively large clarifying compartment provided with a single outlet for clarified milk and a relatively small separating compartment provided with separate outlets for cream and skim milk, means to feed whole milk to both compartments and other means to convey the skim milk separated in the smaller compartment to the larger compartment, whereby whole milk of superstandard cream content may be standardized and clarified and the excess cream separated therefrom in a single centrifuge.

7. A combined centrifugal separator and clarifier for clarifying the whole milk while removing therefrom a part of the cream to thereby produce whole milk having the characteristics of the original whole milk but different therefrom only in its reduced cream content, which comprises a centrifugal bowl having a clarifying compartment and a separating compartment, a feed channel for whole milk having two outlets, one directly opening into the clarifying compartment and the other directly opening into the separating compartment, to thereby feed to both compartments unskimmed whole milk, a cream outlet from the separating compartment, a skim milk outlet from the separating compartment to the clarifying compartment, and a clarified milk outlet from the clarifying compartment.

8. A combined centrifugal separator and clarifier for clarifying the whole milk while removing therefrom a part of the cream to thereby produce whole milk of a reduced cream content, which comprises a centrifugal bowl having a clarifying compartment and a separating compartment, a feed channel for whole milk having two outlets, one directly opening into the clarifying compartment and the other directly opening into the separating compartment, to thereby feed to both compartments unskimmed whole milk, a cream outlet from the separating compartment, the clarifying compartment occupying the entire bowl space except that occupied by the separating compartment, which is of smaller diameter than the bowl, the peripheral part of the separating compartment having a free opening into the greater diameter part of the bowl surrounding the separating compartment, the clarifying compartment thus receiving for clarification whole milk which has not been subjected to separation and milk from which cream has been skimmed and which in the clarifying compartment mixes with the unskimmed whole milk to therein produce a clarified whole milk of reduced fat content.

9. A combined centrifugal separator and clarifier for clarifying whole milk while removing therefrom a part of the cream, thereby producing a clarified whole milk having the characteristics of the original whole milk and differing therefrom only in its reduced content of butter fat, which comprises a centrifugal bowl having a clarifying compartment and a separating compartment, a feed channel for whole milk having two outlets, one opening directly into the clarifying compartment and the other opening directly into the separating compartment whereby whole milk is fed to both compartments, a skim milk outlet from the separating compartment to the clarifying compartment adjacent to the entrance end thereto for whole milk, an independent cream outlet from the separating compartment and means to control the quantity of cream discharged therefrom.

SELDEN H. HALL.